Patented July 13, 1948

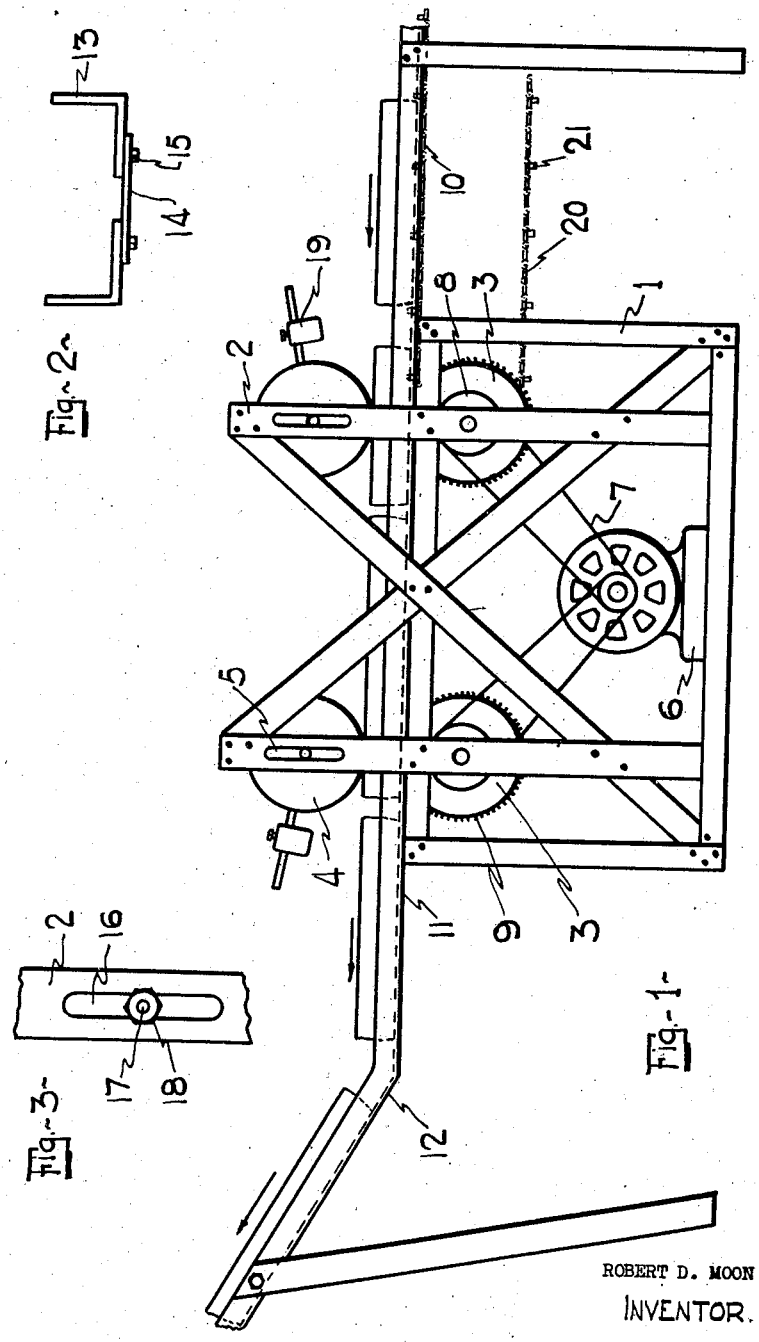

2,445,149

UNITED STATES PATENT OFFICE 2,445,149

CONVEYER MECHANISM FOR PROPELLING TIMBER

Robert Daniel Moon, Edmonton, Alberta, Canada

Application May 23, 1946, Serial No. 671,787
In Canada August 29, 1945

1 Claim. (Cl. 198—43)

This invention relates to an improved conveyor. More specifically the invention is directed to apparatus for loading logs or timber from storage piles into cars for subsequent shipment.

Lumber from storage piles is usually loaded into cars by hand. There are several reasons why conveying devices to load larger pieces of lumber have not come into general use. The storage piles are usually located some distance from the mill and it has not always been convenient to obtain power for the operation of a conveyor. Furthermore, portable conveyors of the type now on the market are not always satisfactory for handling large pieces of timber such as railroad ties or logs. Most of the present portable conveyors are of light construction and would not stand the heavy duties imposed upon them in handling material of the type described.

It is an object of this invention to produce a portable conveyor to handle heavy logs or other pieces of timber such as railway ties.

It is a further object of this invention to produce a loading device or conveyor which is of simple construction and is cheap to operate.

The invention may be simply described as a platform with propelling rollers to engage the lumber which has moved down a chute from the stock pile by gravity and propel it up an inclined chute into the waiting car for shipment. The momentum gained by the propelling devices is such that the logs so moved will advance the other logs in the chute one at a time.

The accompanying drawing clearly illustrates the details of the invention.

Figure 1 is a side elevation of the loading device and the conveyor leading from a stock pile to the car.

Figure 2 is a cross-section of the chutes showing the adjustable features.

Figure 3 is an enlarged view of the floating mounting of the idler roller.

In Figure 1 the framework of the loading apparatus is shown generally at 1. Mounted in this framework and supported by uprights 2 are a series of rollers. Mounted in uprights 2 are rollers shown at 3 which are power driven and have a friction surface on their peripheral faces, as shown at 9. Superimposed over the lower rollers are idler rollers 4, floatingly mounted in the supporting members 2 by the means shown at 5. The chutes for carrying the logs or timber are shown at 10, 11 and 12. These chutes are adjustable as to width as illustrated in Figure 2. The lower or power-driven rollers 3 are driven by any convenient source of power shown at 6. This source of power may be any that is convenient or economical. The connection between the source of power and the rollers as shown by 7 is, in this case, belts operating to connect the motor and the pulleys 8 mounted on each of the power-driven rollers.

In order to provide more flexibility to the loading apparatus a chain conveyor shown at 20 is operated inside of the chute 10. The conveyor 20 is of standard design for lumber work and has dogs 21 mounted at spaced intervals to engage the timber and advance it towards the rollers. The conveyor is driven from the common source of power by a pulley (not shown) mounted on the roller 3.

In Figure 2 as already mentioned, the adjustable feature of the chute 10, 11 and 12 is disclosed. The chutes are constructed of two L-shaped pieces of angle iron shown at 13 and adjustable bottom plate 14 carrying tightening bolts 15 which operate in a slot cut in the leg of the side member. With this adjusting means, the chute may be increased in width to take care of pieces of timber of varying sizes.

The propelling rollers 3 and the idler rollers 4 are made of such width as to handle most of the commercial-sized timber. The friction devices shown at 9 on the driven rollers may take the form of spikes or other well-known roughened surfaces.

The upper or idler rollers 4, as previously described, are floatingly mounted by means generally indicated at 5. The specific method of mounting the rollers is illustrated in Figure 3. Each upright supporting member 2 has a slot 16 which allows the axle shaft 17 of the roller 4 to project through the end of upright member. The shaft 17 is threaded to receive the retaining nut 18. The diameter of the nut 18 is greater than the diameter of the slot 17, preventing the roller from jumping out of the slot. The roller is free to move vertically in the slot thereby permitting material of varying sizes to be handled.

It may be desirable at times to increase the pressure exerted by roller 4 on the pieces of timber in order to operate the loading device more efficiently. To provide this increased pressure a lever arm and counterweight is generally shown at 19. Any other suitable means may be employed rather than the means described above.

In operation logs or ties are moved into the chute 10 which leads from the stock piles to the loading device. Sliding by gravity or pulled by chain conveyor previously described they enter the space between the first set of rollers. The log or tie is propelled in the direction of rotation of pulleys 8 and depending on its momentum, it may or may not be pushed into the bite of the second set of rollers. If it is not long enough or the momentum imparted to it by the first set of rollers is not sufficient, it will lie between the two sets of propelling rollers until a following piece of timber pushes it along. When it is engaged by the second set of rollers it gains sufficient momentum to be pushed up the inclined chute 12 leading into the car. The momentum is sufficient to push or advance pieces of timber which are already lying in the chute ahead of the last driven piece of timber.

The driven rollers 3 are driven at such a speed that the logs are slowly advanced and will not be inconvenient to handle by the loading operator stationed in the box car. The speed is usually adjusted by changing the size of the pulleys 8 so that only one piece of timber is advanced at a time.

It will be apparent that the inventor has produced a loading device of simple construction which may be conveniently operated in any storage yard, even though remote from the usual sources of power.

I claim:

A car loading device for pieces of timber and the like comprising a platform, conveying means including a plurality of sets of conveying rolls turnably mounted on said platform, each of said sets comprising driven lower rolls and upper idler rolls, means to drive the lower rolls, means mounting the upper rolls for free vertical movement towards and from the lower rolls, an upwardly inclined chute at the outlet of said conveying means, an endless chain conveyor extending up to the pair of rolls at the inlet of said conveying means, and driving means for such chain conveyor mounted coaxially with the lower roll of said last pair.

ROBERT DANIEL MOON.

REFERENCES CITED

The following references are of record in the file of this patent:

UNITED STATES PATENTS

| Number | Name | Date |
|---|---|---|
| 475,628 | Stombs | May 24, 1892 |
| 843,519 | Crane | Feb. 5, 1907 |
| 1,572,535 | Jackson | Feb. 9, 1926 |
| 2,167,049 | Maurath et al. | July 25, 1939 |